United States Patent [19]

Goedicke

[11] 4,188,038
[45] Feb. 12, 1980

[54] SEAL ARRANGEMENT FOR INTERSECTING CONDUITS

[75] Inventor: Friedrich E. Goedicke, Trafford, Pa.

[73] Assignee: The United States of America as represented by the United States Department of Energy, Washington, D.C.

[21] Appl. No.: 721,138

[22] Filed: Apr. 10, 1968

[51] Int. Cl.² .............................................. B65D 53/00
[52] U.S. Cl. ..................................... 277/64; 277/191; 277/236
[58] Field of Search ..................... 277/59, 66, 79, 141, 277/215, 61, 62, 22; 285/370, 351, 352, 357

[56] References Cited

U.S. PATENT DOCUMENTS

| 730,925 | 6/1903 | Klein | 277/66 |
| 3,285,614 | 11/1966 | McClenathan | 277/62 |

Primary Examiner—Harvey E. Behrend
Attorney, Agent, or Firm—R. V. Lupo; James D. Hall; David R. Francescani

[57] ABSTRACT

A seal arrangement in which two intersecting conduits are sealed from each other. A sleeve insert is locked in a sealed relationship within one conduit enclosing the openings of the intersecting conduit.

2 Claims, 3 Drawing Figures

SEAL ARRANGEMENT FOR INTERSECTING CONDUITS

BACKGROUND OF THE INVENTION

This invention relates to a seal arrangement for two intersecting conduits in which one conduit is sealed from the other. The invention described herein was made in the course of, or under, a contract with the United States Atomic Energy Commission.

In an engine for rocket vehicle propulsion, a nuclear reactor is utilized to heat a propellant, generally liquid hydrogen, causing it to be converted to a gas which is expanded through a nozzle thereby creating a propulsive thrust. Centrally located within the reactor is a group of bundled fuel elements called the "core". Surrounding the core of the reactor is an open-ended cylindrical housing, hereinafter referred to as a "reflector." The reflector is used to reflect escaping neutrons back into the core thereby permitting the reactor to operate with a smaller fuel load. Beryllium is utilized as a reflector material which because of its high thermal stress and brittleness must be uniformly cooled during reactor operation. One method of cooling is the passing of the hydrogen propellant through coolant conduits within the reflector housing in a heat transfer relationship. In order to assure uniform cooling in the inner periphery of the reflector nearest the reactor core, axially aligned, equally spaced apart conduits are located within and along the inner peripheral section of the reflector. Spring loaded, graphite plungers, or retaining pins, utilized to position the reactor core pass through the reflector in a direction normal to the reflector axis. Because of the small spacing between and the relatively large diameter of the peripheral coolant conduits, there is an intersection between a peripheral coolant conduit and a retaining pin conduit both of which lie within the reflector.

In previous designs coolant passing through the peripheral conduit would seep around the retaining pin and into the retaining pin conduit and, further, into and around the core region of the rocket engine. This seepage or loss of coolant into the core region results in loss of performance and regions of thermal stress around the core. One suggested solution considered to reduce the coolant seepage around the retaining pins was to eliminate those coolant conduits which would intersect the retaining pin conduit. Although this necessarily would prevent any seepage, the elimination of the conduit would cause an undesirable hot spot in the beryllium reflector due to a lack of uniform heat transfer. With the necessity for maintaining the intersecting coolant conduit, effort was then directed to the sealing of the retaining pin conduit in a manner that would allow continuous coolant flow around the graphite pin without coolant seepage into the pin conduit.

SUMMARY OF THE INVENTION

This invention comprises a sleeve insert having its central portion of reduced exterior diameter positioned within the retaining pin conduit at the point of intersection with the coolant conduit. The insert is locked into a sealed position enclosing the openings of the coolant conduit. The reduced wall section of the insert permits coolant flow through the coolant conduit around the insert.

It is therefore an object of this invention to provide a seal arrangement in which each of two intersecting conduits are sealed from each other.

Further it is an object of this invention to provide a replaceable seal arrangement in which each of two intersecting conduits are sealed from each other.

BRIEF DESCRIPTION OF THE DRAWINGS

A preferred embodiment of the invention has been chosen for the purposes of illustration and description wherein.

DESCRIPTION OF THE PREFERRED EMBODIMENT

Figure 1:
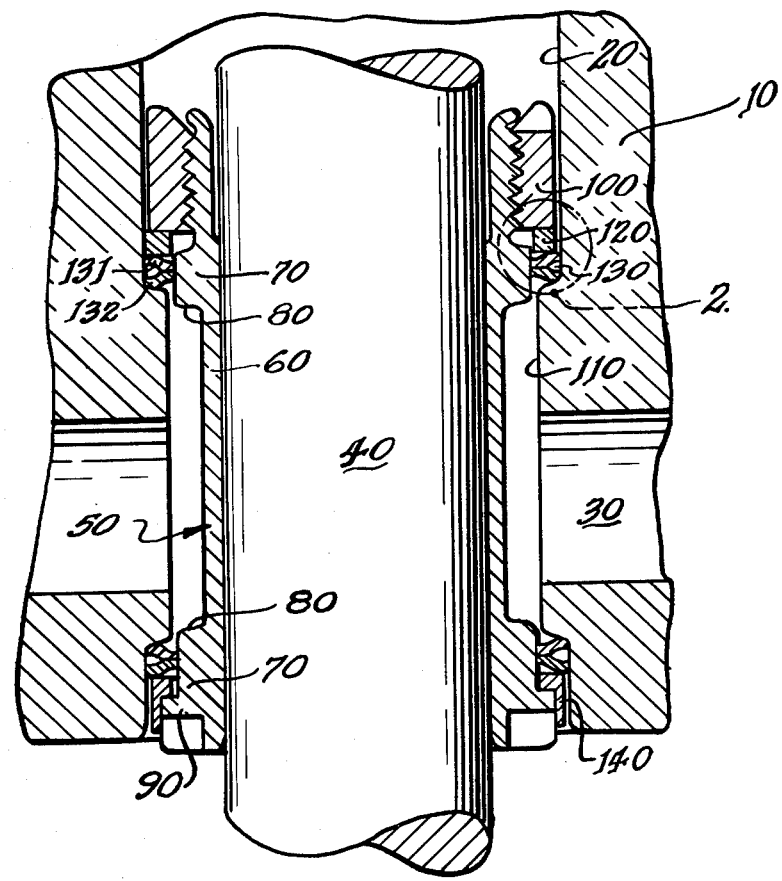
FIG. 1 is a vertical partial sectional view depicting the invention.

Extending through the reflector 10 in radial fashion are conduits 20 (one shown). Each of these conduits 20 intersects an axially directed inner peripheral coolant conduit 30 also within the reflector. It should be noted that for purposes of this invention it is unnecessary that the axes of the respective conduits precisely intersect. Within each of these conduits 20 is a spring loaded cylindrical retaining pin 40, which in this embodiment is constructed of graphite. Each pin is biased against a moveable seal existing between the core and reflector. The moveable seal in turn is biased against a stationary seal. The stationary seal is reacted by the reflector. The number of retaining pin conduits and their location within the reflector vary according to the design of the reactor. Surrounding the retaining pin within the retaining pin conduit at the intersection of the coolant conduit is a sleeve insert 50, substantially cylindrical in shape. The retaining pin fits within the sleeve in a sliding relationship. The central section 60 of the insert is of reduced external diameter with the end sections 70 of the insert of thicker wall construction thereby creating exterior opposing shoulders 80. The length of the central section, or stated differently, the distance between shoulders is of greater dimension than the diameter of the intersecting coolant conduit 30. At one exterior end of the insert upon the shoulder exists a flange 90. The other exterior end of the insert beyond the shoulder is threaded to receive a biasing or loading nut 100.

The retaining pin conduit 20 is off-set on both sides of the intersecting coolant conduit creating two internal circumferential shoulders bounding a narrow 110 which surrounds the coolant conduit. The diameter of the sleeve insert 50 across the threaded thick wall shouldered section is of such a dimension as to allow passage of the insert through the narrow of the retaining pin conduit. The insert lies within the narrow of the reflector retaining pin conduit in such a position that its central section 60 encloses the intersecting coolant conduit. Between the loading nut 100 at the one end of the insert and the flat of a shoulder of the nearby retaining pin conduit off-set is a load ring 120 and a seal 130.

Figure 2:
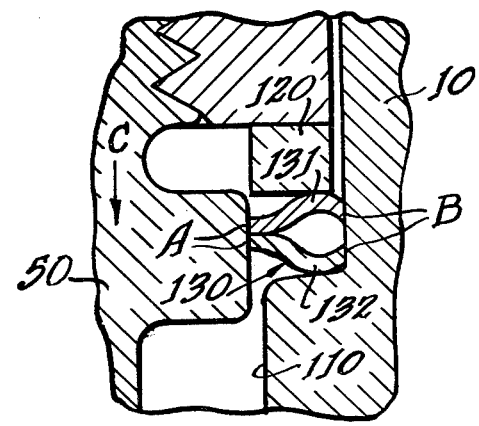
FIG. 2 is an enlargement of the circled seal in FIG. 1.
Figure 3:
FIG. 3 is a sectional view of a seal ring.

The seal 130 abuts the shoulder flat and preferably consists of two coaxial conically shaped rings 131, 132 mounted with their respective conical tops adjacent one another. A sectional view of one seal ring is illustrated in FIG. 3. Due to slight axial shifting of the insert with respect to the reflector because of material expansion and contraction caused by heating and cooling during operation and shutdown of the rocket engine, the seal must have a compensating effect in order to provide a continual seal between the insert and reflector. This is accomplished by the double conical ring seal in the following manner. As illustrated in FIG. 2 each ring makes peripheral sealing contact with the insert at point A and reflector at point B. Should the sleeve insert slightly shift in either direction with respect to the reflector, the one ring beveled in the direction of insert movement partially unloads while the second ring will be wedged more tightly between the insert and reflector and therefore becomes further loaded. Again referring to FIG. 2, with slight insert movement as indicated in direction C, ring 131 will assume a more vertical position thereby becoming partially unloaded and ring 132 will assume a more horizontal position thereby becoming more loaded. It is noted that at all times a seal is maintained by the reflector and the insert.

Similarly, at the opposite end of the insert, coaxially with it, is another double conical ring seal of the same design described in the above paragraph. This seal exists between the flange 90 and the remaining retaining pin conduit shoulder flat and abuts another load ring 140.

In assembly, referring to FIG. 1, after the load ring 140 and conical seal rings have been slipped over the insert and rest against the flange 90, the insert is inserted up into the retaining pin conduit. The remaining conical seal rings and lock ring 120 are dropped into place. The load nut 100 is then threaded onto the thread end of the insert and is biased against the load ring 120 placed between the nut and ring seal. As the load nut is tightened, the entire seal assembly consisting of double conical ring seals and load rings is compressed between the insert flange and a retaining pin conduit flat and the interface of the nut and the other retaining pin conduit flat. This compression loads the conical seal rings by causing each of the four separate rings to flex as previously described, thereby wedging themselves between the insert and reflector. It should be pointed out that other means of sealing could be used as a sealing agent. One such alternative means would be the use of a soft metal O-rings in place of the double conical seal. Also, other means of loading the sealing ring arrangement could be utilized such as the use of a retaining ring in place of the load nut.

In operation, coolant, such as hydrogen, flows through a coolant conduit into the annular plenum formed between the central section of the insert and the narrow of the reflector conduit within the conduit set offs. From the annular plenum, the coolant flows into the opposingly located coaxial channel of the coolant conduit thereby passing around the exterior of the insert which surrounds the graphite plunger. The double conical ring seals prevent coolant seepage into the reflector plunger conduit.

What is claimed is:

1. A seal assembly for sealing first and second intersecting conduits from each other, comprising:
 a housing containing the conduits, the first conduit having an inwardly protruding wall section intersected by the second conduit, the ends of the protruding wall section defining first and second shoulders;
 a stationary sleeve in the first conduit, said sleeve having a central portion narrower than the protruding wall section of the first conduit, and first and second end portions of larger external diameter than the central portion, each end portion being placed adjacent to one of the shoulders of said protruding wall section, the first end portion having attached to it a threaded extension and the second end portion having a flange at its outer extremity;
 a first flexible sealing means surrounding the first end portion of the sleeve and abutting the first shoulder of said protruding wall section;
 a second flexible sealing means surrounding the second end portion of the sleeve and lying between the second shoulder of said protruding wall section and the flange; and
 a single loading nut for simultaneously tightening the first and second flexible sealing means, the loading nut being attached to said threaded extension.

2. The seal assembly of claim 1 wherein each sealing means includes a pair of flexible conically shaped rings, coaxially aligned with inner circular edge portions abutting each other and outer circular edge portions spaced apart when unflexed.

* * * * *